(12) United States Patent
Shimizu et al.

(10) Patent No.: US 6,981,925 B2
(45) Date of Patent: *Jan. 3, 2006

(54) MULTI-PIECE SOLID GOLF BALL

(75) Inventors: Yasumasa Shimizu, Chichibu (JP); Junji Hayashi, Chichibu (JP); Hiroshi Higuchi, Chichibu (JP); Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/724,112

(22) Filed: Dec. 1, 2003

(65) Prior Publication Data

US 2005/0075196 A1  Apr. 7, 2005

(30) Foreign Application Priority Data

Dec. 2, 2002  (JP) .............................. 2002-349726

(51) Int. Cl.
*A63B 37/12* (2006.01)

(52) U.S. Cl. ..................................... 473/376
(58) Field of Classification Search ................ 473/377, 473/376, 378, 351, 371
See application file for complete search history.

(56) References Cited

U.S. PATENT DOCUMENTS

| | | | |
|---|---|---|---|
| 4,546,980 A | 10/1985 | Gendreau et al. | |
| 4,692,497 A | 9/1987 | Gendreau et al. | |
| 4,770,422 A | 9/1988 | Isaac | |
| 4,955,613 A * | 9/1990 | Gendreau et al. ............ | 473/372 |
| 5,306,760 A | 4/1994 | Sullivan | |
| 5,312,857 A | 5/1994 | Sullivan | |
| 2003/0114246 A1 * | 6/2003 | Yokota ........................ | 473/351 |
| 2003/0229183 A1 * | 12/2003 | Voorheis et al. ............ | 525/232 |

FOREIGN PATENT DOCUMENTS

| | | |
|---|---|---|
| JP | 62-089750 A | 4/1987 |
| JP | 63-275356 A | 11/1988 |
| JP | 02-268778 A | 11/1990 |
| JP | 03-151985 A | 6/1991 |
| JP | 07-268132 A | 10/1995 |
| JP | 11-035633 A | 2/1999 |
| JP | 11-070187 A | 3/1999 |
| JP | 11-164912 A | 6/1999 |
| JP | 11-319148 A | 11/1999 |
| JP | 20002-293996 | 10/2002 |
| WO | WO 98/46671 A1 | 10/1998 |

OTHER PUBLICATIONS

Mark R. Mason et al.; "Hydrolysis of Tri-*tert*-butylaluminum: The First Structural Characterization of Alkylalumoxanes $[(R_2Al)_2O]_n$ and $(RAlO)_n$"; American Chemical Society; 115; 1993; pp. 4971-4984.

C. Jeff Harlan et al.; "Three-Coordinate Aluminum Is Not A Prerequisite for Catalytic Activity in the Zirconocene-Alumoxane Polymerization of Ethylene"; American Chemical Society; 117; 1995; pp. 6465-6474.

Report of Research & Development; Fine Chemical; vol. 23; No. 9; Jun. 1, 1994; pp. 5-15.

* cited by examiner

*Primary Examiner*—Raeann Gorden
(74) *Attorney, Agent, or Firm*—Sughrue Mion, PLLC

(57) ABSTRACT

A multi-piece solid golf ball has a solid core obtained by molding and vulcanizing a rubber composition which includes (A) a base rubber containing a polybutadiene synthesized using a rare-earth catalyst, (B) an unsaturated carboxylic acid and/or a metal salt thereof, (C) an organic sulfur compound, (D) an inorganic filler and (E) an organic peroxide. The core is enclosed within a mantle of one or more layer which is made primarily of a thermoplastic resin and has a Durometer D hardness of 30 to 70. The mantle is enclosed within a cover which is made primarily of a thermoplastic polyurethane and which has a Durometer D hardness of 40 to 60 that is lower than the Durometer D hardness of the outermost layer of the mantle. This construction provides the golf ball with an outstanding rebound.

17 Claims, No Drawings

MULTI-PIECE SOLID GOLF BALL

BACKGROUND OF THE INVENTION

1. Field of the Invention

The present invention relates to multi-piece solid gold balls such as four-piece solid golf balls.

2. Prior Art

The polybutadiene formulations used as the base rubber in golf balls have hitherto been modified and improved in various ways to confer the golf balls with outstanding rebound characteristics.

For example, JP-A 62-89750 discloses rubber compositions for solid golf balls which are obtained by formulating as the base rubber a polybutadiene having a Mooney viscosity of 70 to 100 and synthesized using a nickel or cobalt catalyst, in combination with either a polybutadiene having a Mooney viscosity of 30 to 90 and synthesized using a lanthanide series catalyst or a polybutadiene having a Mooney viscosity of 20 to 50 and synthesized using a nickel or cobalt catalyst. However, further improvement is desired in the rebound characteristics afforded by these rubber compositions.

JP-A 2-268778 describes golf balls obtained by compounding a polybutadiene having a Mooney viscosity of less than 50 and synthesized using a group VIII catalyst with a polybutadiene having a Mooney viscosity of less than 50 and synthesized using a lanthanide catalyst. Unfortunately, such golf balls have poor rebound characteristics.

In addition, JP-A 11-70187 discloses multi-piece solid golf balls in which the mantle is made of a polybutadiene having a low Mooney viscosity. JP-A 11-319148 teaches solid golf balls obtained using a rubber composition formulated from a polybutadiene having a Mooney viscosity of 50 to 69 and synthesized using a nickel or cobalt catalyst in combination with a polybutadiene having a Mooney viscosity of 20 to 90 and synthesized using a lanthanide series catalyst. JP-A 11-164912 describes solid golf balls obtained using a rubber composition having a 1,2-vinyl unit content of not more than 2.0% and having a ratio Mw/Mn of the weight-average molecular weight to the number-average molecular weight of not more than 3.5. JP-A 63-275356 discloses golf balls made with a rubber composition formulated using a high Mooney viscosity polybutadiene. JP-A 3-151985 describes golf balls made with a rubber composition formulated using a polybutadiene having a high number-average molecular weight in combination with a polybutadiene having a low number-average molecular weight. However, the golf balls in all of these prior-art disclosures have inadequate rebound characteristics.

Also, JP-A 61-71070 mentions the use of two types of organic peroxides and JP-A 62-112574 mentions the use of a small amount of organic peroxide. Yet, the golf balls obtained in both of these disclosures have inadequate rebound characteristics. Moreover, crosslinking takes a long time, considerably diminishing productivity during manufacture of the golf balls.

SUMMARY OF THE INVENTION

It is therefore an object of the present invention to provide golf balls which have a high rebound and exert a good flight performance.

We have found that golf balls of excellent manufacturability and good rebound characteristics can be obtained when the solid core of the ball is made of a molded and vulcanized rubber composition containing a base rubber composed primarily of a polybutadiene of at least 60 wt % cis-1,4 structure and synthesized using a rare-earth catalyst, and containing also 0.1 to 0.8 parts by weight of an organic peroxide per 100 parts by weight of the base rubber. That is, in the prior art, lowering the amount of organic peroxide has increased the vulcanization time, leading to a decline in productivity and has also resulted in poor rebound characteristics. However, we have discovered that by using high-resilience polybutadiene synthesized with a rare-earth catalyst and by including in the rubber composition 0.1 to 0.8 part by weight of preferably two or more types of organic peroxides with significantly differing half-lives, the ease of operation is improved, the vulcanization time is shortened and even productivity can be enhanced, in addition to which further improvements in the rebound characteristics of the golf ball can also be achieved.

Such an increase in rebound allows the core and the ball as a whole to be made correspondingly softer, resulting in desirable initial conditions (i.e., low spin and high angle of elevation) and increased carry on a full shot with a driver. Moreover, a soft feel on impact can also be achieved.

Accordingly, in a first aspect, the invention provides a multi-piece solid golf ball constructed of a solid core, a mantle of at least one layer and a cover. The core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid and/or an unsaturated carboxylic acid metal salt, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm. The mantle is made primarily of a thermoplastic resin, has a thickness of at least 0.5 mm, has a Durometer D hardness of 30 to 70, and includes an outermost layer which is in contact with the cover and has a specific Durometer D hardness. The cover is made primarily of a thermoplastic polyurethane, has a thickness of 0.5 to 2.5 mm and has a Durometer D hardness of 40 to 60 which is lower than the Durometer D hardness of the outermost layer of the mantle. The golf ball has a deflection when subjected to a load of 980 N (100 kg) of 2.0 to 4.0 mm. This golf ball exhibits an excellent spin performance and excellent flight characteristics.

To provide the golf ball with an even better spin performance and better flight characteristics, the outermost layer of the mantle in contact with the cover has a Durometer D hardness of preferably 45 to 70.

To further enhance the rebound characteristics of the ball, the polybutadiene in the base rubber of the rubber composition is preferably a modified polybutadiene rubber synthesized using a neodymium catalyst, followed by reaction with a terminal modifier.

The rubber composition from which the core is made preferably includes (A) 100 parts by weight of a base rubber, (B) 10 to 60 parts by weight of an unsaturated carboxylic acid and/or an unsaturated carboxylic acid metal salt, (C) 0.1 to 5 parts by weight of an organic sulfur compound, (D) 5 to 80 parts by weight of an inorganic filler, and (E) 0.1 to 0.8 part by weight of at least two different organic peroxides. This rubber composition can further enhance the rebound characteristics of the golf ball, and can also optimize the hardness and weight of the ball.

The cover is preferably made of a composition consisting essentially of (G) a thermoplastic polyurethane material, and (H) an isocyanate mixture obtained by dispersing (h1) an isocyanate compound bearing as functional groups at least two isocyanate groups per molecule in (h2) a thermoplastic resin which substantially does not react with isocyanate. A cover of this composition can provide the ball with improved scuff resistance.

In one preferred embodiment, at least one layer of the mantle in the golf ball according to the first aspect of the invention is made of a mixture composed of 100 parts by weight of resin components which include a base resin of (M) an olefin/unsaturated carboxylic acid binary random copolymer and/or a metal ion neutralization product of an olefin/unsaturated carboxylic acid binary random copolymer, and (N) an olefin/unsaturated carboxylic acid/unsaturated carboxylic acid ester ternary random copolymer and/or a metal ion neutralization product of an olefin/unsaturated carboxylic acid/unsaturated carboxylic acid ester ternary random copolymer in a weight ratio M/N of 100:0 to 25:75, in combination with (P) a non-ionomeric thermoplastic elastomer in a weight ratio (M+N)/P of 100:0 to 50:50; (Q) 5 to 80 parts by weight of a fatty acid and/or fatty acid derivative having a molecular weight of 280 to 1,500; and (R) 0.1 to 10 parts by weight of a basic inorganic metal compound capable of neutralizing un-neutralized acid groups in the base resin and component Q. A mantle layer of this composition further enhances the rebound characteristics of the ball.

In another preferred embodiment, at least one layer of the mantle in the golf ball according to the first aspect of the invention is made of a mixture composed of resin components which include at least one base resin selected from the group consisting of (M) olefin/unsaturated carboxylic acid binary random copolymers and metal ion neutralization products thereof and (N) olefin/unsaturated carboxylic acid/unsaturated carboxylic acid ester ternary random copolymers and metal ion neutralization products thereof, in combination with (P) a non-ionomeric thermoplastic elastomer in a weight ratio (M+N)/P of 100:0 to 50:50; (Q) a fatty acid and/or fatty acid derivative having a molecular weight of 280 to 1,500; (R) a metal ion source capable of neutralizing un-neutralized acid groups in the base resin and component Q; and (S) a compound having a molecular weight of not more than 20,000 which bears at least two reactive functional groups. A mantle constituted in this way improves adhesion between the cover and the underlying layer, and enhances both the rebound characteristics and the durability of the ball.

To achieve both good ball softness and good rebound characteristics, it is preferable for at least one layer of the mantle to be made primarily of a thermoplastic polyester.

In a second aspect, the invention provides a four-piece solid golf ball constructed of a solid core, a two-layer mantle and a cover. The core is obtained by molding and vulcanizing a rubber composition comprising (A) 100 parts by weight of a base rubber which includes 60 to 100 wt % of a polybutadiene of at least 60% cis-1,4 structure and synthesized using a rare-earth catalyst, (B) an unsaturated carboxylic acid and/or an unsaturated carboxylic acid metal salt, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm. The mantle is composed of an inner layer and an outer layer which is in contact with the cover, each of the two layers being made of a thermoplastic resin, having a thickness of 0.5 to 2 mm and having a Durometer D hardness of 30 to 70. The cover is made primarily of a thermoplastic polyurethane, has a thickness of 0.5 to 2.5 mm and has a Durometer D hardness of 40 to 60 which is lower than the Durometer D hardness of the outer layer of the mantle. The golf ball has a deflection when subjected to a load of 980 N (100 kg) of 2.0 to 4.0 mm. This golf ball exhibits an excellent spin performance and excellent flight characteristics.

To provide the four-piece solid golf ball according to the second aspect of the invention with an even better spin performance and better flight characteristics, the outer layer of the mantle in contact with the cover has a Durometer D hardness of preferably 45 to 70.

To further enhance the rebound characteristics of the golf ball according to the second aspect of the invention, the polybutadiene in the base rubber of the rubber composition is typically a modified polybutadiene rubber synthesized using a neodymium catalyst, followed by reaction with a terminal modifier.

The rubber composition from which the core in such a golf ball is made preferably includes (A) 100 parts by weight of a base rubber, (B) 10 to 60 parts by weight of an unsaturated carboxylic acid and/or an unsaturated carboxylic acid metal salt, (C) 0.1 to 5 parts by weight of an organic sulfur compound, (D) 5 to 80 parts by weight of an inorganic filler, and (E) 0.1 to 0.8 part by weight of at least two different organic peroxides. This rubber composition can further enhance the rebound characteristics of the golf ball and can also optimize the hardness and weight of the ball.

The cover in the golf ball according to the second aspect of the invention is preferably made of a composition consisting essentially of (G) a thermoplastic polyurethane material, and (H) an isocyanate mixture obtained by dispersing (h1) an isocyanate compound bearing as functional groups at least two isocyanate groups per molecule in (h2) a thermoplastic resin which substantially does not react with isocyanate. A cover of this composition can provide the ball with improved scuff resistance.

In one preferred embodiment of the golf ball according to the second aspect of the invention, at least one layer of the mantle is made of a mixture composed of 100 parts by weight of resin components which include a base resin of (M) an olefin/unsaturated carboxylic acid binary random copolymer and/or a metal ion neutralization product of an olefin/unsaturated carboxylic acid binary random copolymer, and (N) an olefin/unsaturated carboxylic acid/unsaturated carboxylic acid ester ternary random copolymer and/or a metal ion neutralization product of an olefin/unsaturated carboxylic acid/unsaturated carboxylic acid ester ternary random copolymer in a weight ratio M/N of 100:0 to 25:75, in combination with (P) a non-ionomeric thermoplastic elastomer in a weight ratio (M+N)/P of 100:0 to 50:50; (Q) 5 to 80 parts by weight of a fatty acid and/or fatty acid derivative having a molecular weight of 280 to 1,500; and (R) 0.1 to 10 parts by weight of a basic inorganic metal compound capable of neutralizing un-neutralized acid groups in the base resin and component Q. A mantle layer of this composition further enhances the rebound characteristics of the ball.

In another preferred embodiment of the golf ball according to the second aspect of the invention, at least one layer of the mantle is made of a mixture composed of resin components which include at least one base resin selected from the group consisting of (M) olefin/unsaturated carboxylic acid binary random copolymers and metal ion neutralization products thereof and (N) olefin/unsaturated carboxylic acid/unsaturated carboxylic acid ester ternary random copolymers and metal ion neutralization products thereof, in combination with (P) a non-ionomeric thermoplastic elastomer in a weight ratio (M+N)/P of 100:0 to 50:50; (Q) a fatty acid and/or fatty acid derivative having a molecular weight of 280 to 1,500; (R) a metal ion source capable of neutralizing un-neutralized acid groups in the base resin and component Q; and (S) a compound having a molecular weight of not more than 20,000 which bears at least two reactive functional groups. A mantle constituted in this way improves adhesion between the cover and the underlying layer, and enhances both the rebound characteristics and the durability of the ball.

To achieve both good ball softness and good rebound characteristics, it is preferable for the outer layer or the inner layer of the mantle in the golf ball according to the second aspect of the invention to be made primarily of a thermoplastic polyester.

DETAILED DESCRIPTION OF THE INVENTION

The golf balls according to the invention have a core obtained by molding and vulcanizing a rubber composition containing (A) a base rubber which includes primarily a polybutadiene of at least 60 wt % cis-1,4 structure, has a Mooney viscosity ($ML_{1+4}$ (100° C.)) of preferably at least 40 and is synthesized using a rare-earth catalyst, (B) an unsaturated carboxylic acid and/or an unsaturated carboxylic acid metal salt, (C) an organic sulfur compound, (D) an inorganic filler and (E) an organic peroxide.

The polybutadiene in component A has a cis-1,4 unit content of at least 60 wt %, preferably at least 80 wt %, more preferably at least 90 wt %, and most preferably at least 95 wt %. A polybutadiene having too low a cis-1,4 unit content will lower the resilience of the core.

It is desirable for the polybutadiene to have a Mooney viscosity ($ML_{1+4}$ (100° C.)) of at least 40, preferably at least 50, more preferably at least 52, and most preferably at least 54, but not more than 140, preferably not more than 120, more preferably not more than 100, and most preferably not more than 80.

The term "Mooney viscosity" used herein refers to an industrial index of viscosity (see JIS K6300) as measured with a Mooney viscometer, which is a type of rotary plastometer. This value is represented by the symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene employed in the invention must be one synthesized using a rare-earth catalyst. A known rare-earth catalyst may be used for this purpose.

Exemplary catalysts include lanthanide series rare-earth compounds in combination with organoaluminum compounds, alumoxanes, halogen-bearing compounds or Lewis bases.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon residue of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

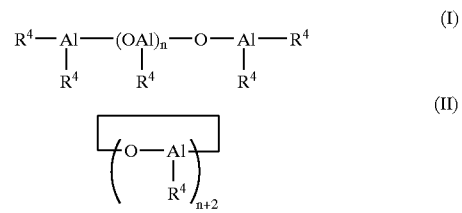

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon residue of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$ (wherein "Me" stands for methyl); and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is advantageous because it enables a polybutadiene rubber having a high cis-1,4 unit content and a low 1,2-vinyl unit content to be obtained at an excellent polymerization activity. Preferred examples of such rare-earth catalysts include those mentioned in JP-A 11-35633.

To achieve a polybutadiene having a cis unit content within the above range and a polydispersity index Mw/Mn within the subsequently described range, the polymerization of butadiene in the presence of a rare-earth catalyst containing a lanthanide series rare-earth compound is carried out at a butadiene/(lanthanide series rare-earth compound) molar ratio of preferably 1,000 to 2,000,000, and especially 5,000 to 1,000,000, and at an $AlR^1R^2R^3$/(lanthanide series rare-earth compound) molar ratio of 1 to 1,000, and especially 3 to 500. It is also preferable for the (halogen compound)/(lanthanide series rare-earth compound) molar ratio to be 0.1 to 30, and especially 0.2 to 15, and for the (Lewis base)/(lanthanide series rare-earth compound) molar ratio to be 0 to 30, and especially 1 to 10.

The polymerization of butadiene in the presence of a rare-earth catalyst may be carried out in a solvent or by bulk polymerization or vapor phase polymerization, without the use of solvent, and at a polymerization temperature in a range of generally −30° C. to +150° C., and preferably 10° C. to 100° C.

According to a preferred embodiment of the invention, the polybutadiene in component A may be a modified polybutadiene obtained by polymerization using the above-described rare-earth catalyst, followed by the reaction of a terminal modifier with active end groups on the polymer.

The modified polybutadiene rubber can be prepared by polymerization as described above, followed by the use of a terminal modifier selected from among types (1) to (7) below. (1) The modified polybutadiene rubber can be obtained by reacting an alkoxysilyl group-bearing compound with active end groups on the polymer. Preferred alkoxysilyl group-bearing compounds are alkoxysilane compounds having at least one epoxy group or isocyanate group on the molecule. Specific examples include epoxy group-bearing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensation products of 3-glycidyloxypropyltrimethoxysilane and condensation products of (3-glycidyloxypropyl)methyldimethoxysilane; and isocyanate group-bearing alkoxysilane compounds such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensation products of 3-isocyanatopropyltrimethoxysilane and condensation products of (3-isocyanatopropyl)methyldimethoxysilane.

A Lewis acid can be added to accelerate the reaction when the above alkoxysilyl group-bearing compound is reacted with active end groups. The Lewis acid acts as a catalyst to promote the coupling reaction, thus improving cold flow by the modified polymer and providing a better shelf stability. Examples of suitable Lewis acids include dialkyltin dialkyl malates, dialkyltin dicarboxylates and aluminum trialkoxides.

Other types of terminal modifiers that may be used include:

(2) halogenated organometallic compounds, halogenated metallic compounds and organometallic compounds of the general formulas $R^5_n M'X_{4-n}$, $M'X_4$, $M'X_3$, $R^5_n M'(-R^6-COOR^7)_{4-n}$ or $R^5_n M'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(3) heterocumulene compounds having on the molecule a Y=C=Z linkage (wherein Y is a carbon, oxygen, nitrogen or sulfur atom; and Z is an oxygen, nitrogen or sulfur atom);

(4) three-membered heterocyclic compounds containing on the molecule the following bonds

(wherein Y is an oxygen, nitrogen or sulfur atom);

(5) halogenated isocyano compounds;

(6) carboxylic acids, acid halides, ester compounds, carbonate compounds and acid anhydrides of the formula $R^8-(COOH)_m$, $R^9(COX)_m$, $R^{10}-(COO-R^{11})_m$, $R^{12}-OCOO-R^{13}$, and $R^{14}-(COOCO-R^{15})_m$, and compounds of the formula:

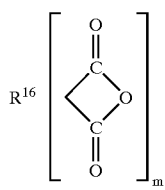

(wherein $R^8$ to $R^{16}$ are each independently a hydrocarbon group of 1 to 50 carbons, X is a halogen atom, and m is an integer from 1 to 5); and (7) carboxylic acid metal salts of the formula $R^{17}_1 M''$ $(OCOR^{18})_{4-1}$, $R^{19}_1 M''(OCO-R^{20}-COOR^{21})_{4-1}$ or

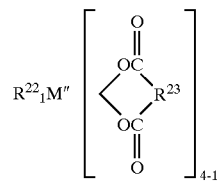

(wherein $R^{17}$ to $R^{23}$ are each independently a hydrocarbon group of 1 to 20 carbons, M" is a tin, silicon or germanium atom, and 1 is an integer from 0 to 3).

The above terminal modifiers and methods for their reaction are described in, for example, JP-A 11-35633, JP-A 7-268132 and JP-A 2002-293996.

It is advantageous for the polybutadiene used in the invention to have a polydispersity index Mw/Mn (where Mw is the weight-average molecular weight and Mn is the number-average molecular weight) of at least 2.0, preferably at least 2.2, more preferably at least 2.4, and most preferably at least 2.6, but not more than 8.0, preferably not more than 7.5, more preferably not more than 4.0, and most preferably not more than 3.4. If the polydispersity index Mw/Mn is too low, the rubber composition may be more difficult to work. On the other hand, if Mw/Mn is too large, the solid core obtained therefrom may have a lower resilience.

The invention uses a base rubber composed primarily of the above-described polybutadiene. The polybutadiene content within the base rubber is at least 60 wt %, preferably at least 70 wt %, more preferably at least 80 wt %, and most preferably at least 85 wt %. The content of the above polybutadiene in the base rubber may be as much as 100 wt %, although the polybutadiene content can be set to not more than 95 wt %, or in some cases to not more than 90 wt %.

In addition to the above-described polybutadiene, the base rubber serving as component A may include also other polybutadienes, such as polybutadienes prepared using a group VIII metal compound catalyst, and other diene rubbers, some examples of which are styrene-butadiene rubber, natural rubber, isoprene rubber and ethylene-propylene-diene rubber.

Of the rubber ingredients other than the above-described polybutadiene, the use of a second polybutadiene prepared using a group VIII catalyst and having a Mooney viscosity $(ML_{1+4} (100° C.))$ of less than 50 and a viscosity η at 25° C., as a 5 wt % toluene solution, of at least 200 mPa·s but not more than 400 mPa·s is preferable for achieving a rubber composition having a good workability and a solid core having a high resilience.

Group VIII catalysts that may be used include nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include the following composed of cobalt or cobalt compounds: Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the group VIII catalysts described above, and especially a nickel or cobalt catalyst, can generally be carried out by a process in which the catalyst is continuously charged into the reactor together with a solvent and the butadiene monomer. The reaction conditions are suitably selected from a temperature range of 5 to 60° C. and a pressure range of atmospheric pressure to 70 plus atmospheres, so as to yield a product having the above-indicated Mooney viscosity.

The second polybutadiene has a Mooney viscosity of less than 50, preferably not more than 48, and most preferably not more than 45. It is advantageous for the lower limit in the Mooney viscosity to be at least 10, preferably at least 20, more preferably at least 25, and most preferably at least 30.

The second polybutadiene has a viscosity $\eta$ at 25° C., as a 5 wt % solution in toluene, of at least 200 mPa·s, preferably at least 210 mPa·s, more preferably at least 230 mPa·s, and most preferably at least 250 mPa·s, but not more than 400 mPa·s, preferably not more than 370 mPa·s, more preferably not more than 340 mPa·s, and most preferably not more than 300 mPa·s.

In the invention, the "viscosity $\eta$ at 25° C. as a 5 wt % solution in toluene" (in mPa·s) refers to the value obtained by dissolving 2.28 g of the polybutadiene to be measured in 50 ml of toluene and using as the reference fluid a standard fluid for viscometer calibration (JIS Z8809) to carry out measurement at 25° C. with the requisite viscometer.

The second polybutadiene is typically included in the base rubber in an amount of 0% or more, preferably at least 5%, and more preferably at least 10% by weight, but not more than 40%, preferably not more than 30%, even more preferably not more than 20%, and most preferably not more than 15% by weight.

Component B in the invention is an unsaturated carboxylic acid and/or an unsaturated carboxylic acid metal salt. Examples of suitable unsaturated carboxylic acids include acrylic acid, methacrylic acid, maleic acid and fumaric acid. Acrylic acid and methacrylic acid are especially preferred. Examples of suitable unsaturated carboxylic acid metal salts include zinc salts and magnesium salts. Of these, zinc acrylate is especially preferred.

The amount of the unsaturated carboxylic acid and/or unsaturated carboxylic acid metal salt (component B) per 100 parts by weight (sometimes abbreviated hereinafter as "parts") of the base rubber serving as component A is generally at least 10 parts, preferably at least 15 parts, and most preferably at least 20 parts, but generally not more than 60 parts, preferably not more than 50 parts, more preferably not more than 45 parts, and most preferably not more than 40 parts.

Component C in the invention is an organic sulfur compound. Exemplary organic sulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the zinc salts thereof; diphenylpolysulfides, dibenzylpolysulfides, dibenzoylpolysulfides, dibenzothiazoylpolysulfides and dithiobenzoylpolysulfides having 2 to 4 sulfurs; alkylphenyldisulfides, furan ring-bearing sulfur compounds and thiophene ring-bearing sulfur compounds. Diphenyldisulfide and the zinc salt of pentachlorothiophenol are especially preferred.

The amount of component C per 100 parts of the base resin serving as component A is generally at least 0.1 part, preferably at least 0.2 part, more preferably at least 0.4 part, and most preferably at least 0.7 part, but generally not more than 5 parts, preferably not more than 4 parts, more preferably not more than 3 parts, even more preferably not more than 2 parts, and most preferably not more than 1.5 parts. Too little component C may fail to provide a resilience-improving effect, whereas too much component C may result in an excessively low core hardness and thus insufficient resilience.

Component D in the invention is an inorganic filler, illustrative examples of which include zinc oxide, barium sulfate and calcium carbonate. The amount of component D per 100 parts of component A is generally at least 5 parts, preferably at least 7 parts, more preferably at least 10 parts, and most preferably at least 13 parts, but generally not more than 80 parts, preferably not more than 65 parts, more preferably not more than 50 parts, and most preferably not more than 40 parts. The use of too much or too little component D may make it impossible to achieve a golf ball having the proper weight and a desirable rebound.

The organic peroxide used as component E in the invention may be a single organic peroxide, although the use of a combination of two or more organic peroxides is preferred. If (a) represents the organic peroxide having the shortest half-life at 155° C., (b) represents the organic peroxide having the longest half-life at 155° C., and the half-lives of (a) and (b) are denoted as $a_t$ and $b_t$ respectively, it is desirable for the half-life ratio $b_t/a_t$ to be at least 7, preferably at least 8, more preferably at least 9, and most preferably at least 10, but not more than 20, preferably not more than 18, and most preferably not more than 16. Even with the use of two or more organic peroxides, at a half-life ratio outside of the above range, the desired levels of ball rebound, compression and durability may not be achieved.

It is desirable for (a) to have a half-life $a_t$ at 155° C. of at least 5 seconds, preferably at least 10 seconds, and most preferably at least 15 seconds, but not more than 120 seconds, preferably not more than 90 seconds, and most preferably not more than 60 seconds. It is desirable for (b) to have a half-life $b_t$ at 155° C. of at least 300 seconds, preferably at least 360 seconds, and most preferably at least 420 seconds, but not more than 800 seconds, preferably not more than 700 seconds, and most preferably not more than 600 seconds.

Specific examples of suitable organic peroxides include dicumyl peroxide, 1,1-bis(t-butylperoxy)-3,5,5-trimethylcyclohexane and α,α'-bis(t-butylperoxy)diisopropylbenzene. These organic peroxides may be commercially available products, such as Percumil D (available from NOF Corporation), Perhexa 3M (NOF Corporation) and Luperco 231XL (available from Atochem Co.). The use of 1,1-bis(t-butylperoxy)-3,5,5-trimethylcyclohexane as above organic peroxide (a) and dicumyl peroxide as above organic peroxide (b) is preferred.

The overall amount of organic peroxide used as component E, per 100 parts of component A, is at least 0.1 part, preferably at least 0.2 part, more preferably at least 0.3 part, and most preferably at least 0.4 part, but nor more that 0.8 part, preferably not more than 0.7 part, more preferably not more than 0.6 part, and most preferably not more than 0.5 part. Too little organic peroxide increases the time required for crosslinking, substantially lowering productivity during manufacture of the golf ball and also lowering compression by the ball. On the other hand, too much organic peroxide lowers the rebound and durability of the ball.

The amount of organic peroxide (a) included in the solid core per 100 parts of component A is preferably at least 0.05 part, more preferably at least 0.08 part, and most preferably at least 0.1 part, but preferably not more than 0.5 part, more preferably not more than 0.4 part, and most preferably not more than 0.3 part. The amount of organic peroxide (b) included per 100 parts of component A is preferably at least 0.05 part, more preferably at least 0.15 part, and most preferably at least 0.2 part, but preferably not more than 0.7 part, more preferably not more than 0.6 part, and most preferably not more than 0.5 part.

If necessary, the rubber composition may also include an antioxidant in an amount, per 100 parts of component A, of at least 0.05 part, preferably at least 0.1 part, and more preferably at least 0.2 part, but not more than 3 parts, preferably not more than 2 parts, more preferably not more than 1 part, and most preferably not more than 0.5 part. The antioxidant may be a commercially available product, such as Nocrac NS-6, Nocrac NS-30 (both made by Ouchi Shinko Chemical Industry Co., Ltd.), and Yoshinox 425 (made by Yoshitomi Pharmaceutical Industries, Ltd.).

The molded and vulcanized core of the inventive golf ball can be obtained by vulcanizing and curing the above-described rubber composition using a method of the same type as that used with known golf ball rubber compositions. For example, vulcanization may be carried out at a temperature of 100 to 200° C. for a period of 10 to 40 minutes.

In the practice of the invention, the above golf ball core has a hardness which can be adjusted as appropriate for the intended use of the golf ball and is not subject to any particular limitation. That is, the molded core may have a cross-sectional hardness profile which is flat from the center to the surface of the core, or which varies from the center to the surface. Specifically, the molded core must have a deflection, when subjected to a load of 980 N (100 kg), of at least 2.5 mm, preferably at least 2.7 mm, and most preferably at least 3.0 mm, but not more than 6.0 mm, preferably not more than 5.5 mm, and most preferably not more than 5.0 mm. A core which is too hard and has too small a deflection will worsen the feel of the golf ball upon impact and, particularly on long shots such as with a driver in which the ball incurs a large deformation, will subject the ball to an excessive increase in spin, reducing the carry. On the other hand, when the core is too soft, the golf ball will have a less lively feel when hit and a smaller rebound that shortens its carry, and will also have a poor durability to cracking with repeated impact.

The core has a diameter of at least 30.0 mm, and preferably at least 32.0 mm, but not more than 40.0 mm, and preferably not more than 39.0 mm.

It is recommended that the core have a specific gravity of generally at least 0.9, preferably at least 1.0, and most preferably at least 1.1, but not more than 1.4, preferably not more than 1.3, and most preferably not more than 1.2.

The multi-piece solid golf ball of the invention has a mantle of at least one layer which encloses the above-described core, and also has a cover which encloses the mantle. If the inventive ball is a four-piece solid golf ball, the mantle is composed of two layers: an inner layer and an outer layer.

The mantle is made of a thermoplastic resin, and at least one layer thereof is composed of material [I] or [II] below.

[I] A mixture comprising as essential components: at least 100 parts by weight of resin components which include a base resin of (M) an olefin/unsaturated carboxylic acid binary random copolymer and/or a metal ion neutralization product thereof and (N) an olefin/unsaturated carboxylic acid/unsaturated carboxylic acid ester ternary random copolymer and/or a metal ion neutralization product thereof in a weight ratio M/N of 100:0 to 25:75, in combination with (P) a non-ionomeric thermoplastic elastomer in a weight ratio (M+N)/P of 100:0 to 50:50;

(Q) 5 to 80 parts by weight of a fatty acid and/or fatty acid derivative having a molecular weight of 280 to 1,500; and (R) 0.1 to 10 parts by weight of a basic inorganic metal compound capable of neutralizing un-neutralized acid groups in the base resin and component Q.

[II] A mixture comprising as essential components:

resin components which include at least one base resin selected from the group consisting of (M) olefin/unsaturated carboxylic acid binary random copolymers and metal ion neutralization products thereof and (N) olefin/unsaturated carboxylic acid/unsaturated carboxylic acid ester ternary random copolymers and metal ion neutralization products thereof, in combination with (P) a non-ionomeric thermoplastic elastomer in a weight ratio (M+N)/P of 100:0 to 50:50;

(Q) a fatty acid and/or fatty acid derivative having a molecular weight of 280 to 1,500;

(R) a metal ion source capable of neutralizing un-neutralized acid groups in the base resin and component Q; and (S) a compound having a molecular weight of not more than 20,000 which bears at least two reactive functional groups.

In material [I], the olefins in the above base resin, both in component M and component N, have a number of carbons that is generally at least 2, but not more than 8, and preferably not more than 6. Suitable examples include ethylene, propylene, butene, pentene, hexene, heptene and octene. Ethylene is especially preferred.

Illustrative examples of the unsaturated carboxylic acid include acrylic acid, methacrylic acid, maleic acid and fumaric acid. Acrylic acid and methacrylic acid are especially preferred.

The unsaturated carboxylic acid ester is preferably a lower alkyl ester of the unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin/unsaturated carboxylic acid binary random copolymer of component M and the olefin/unsaturated carboxylic acid/unsaturated carboxylic acid ester ternary random copolymer of component N (the copolymers in components M and N are hereinafter referred to collectively as "random copolymers") can each be obtained by suitably formulating the above constituents and using a known method to carry out random copolymerization.

It is recommended that these random copolymers be prepared such as to have a specific unsaturated carboxylic acid content (sometimes referred to hereinafter as the "acid content"). The amount of unsaturated carboxylic acid included within the random copolymer of component M is generally at least 4 wt %, preferably at least 6 wt %, more preferably at least 8 wt %, and most preferably at least 10 wt %, but generally not more than 30 wt %, preferably not more than 20 wt %, more preferably not more than 18 wt %, and most preferably not more than 15 wt %.

Similarly, it is recommended that the amount of unsaturated carboxylic acid included within the random copolymer of component N be generally at least 4 wt %, preferably at least 6 wt %, and most preferably at least 8 wt %, but not more than 15 wt %, preferably not more than 12 wt %, and most preferably not more than 10 wt %. If the random copolymers have too low an acid content, the rebound of the ball may decline. On the other hand, too high an acid content may lower the processability of the material.

The metal ion neutralization product of an olefin/unsaturated carboxylic acid binary random copolymer in component M and the metal ion neutralization product of an olefin/unsaturated carboxylic acid/unsaturated carboxylic acid ester ternary random copolymer in component N (the metal ion neutralization products of random copolymers in components M and N are hereinafter referred to collectively as "metal ion-neutralized random copolymers") can be obtained by partially neutralizing the acid groups on the random copolymer with metal ions.

Illustrative examples of metal ions for neutralizing the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. Preferred metal ions include $Na^+$, $Li^+$, $Zn^{2+}$ and $Mg^{2+}$. The use of $Zn^{2+}$ is especially recommended.

The metal ion-neutralized random copolymers may be prepared by neutralization of the above random copolymers with the above metal ions. For example, use may be made of a neutralization method that involves the use of compounds such as the formates, acetates, nitrates, carbonates, bicarbonates, oxides, hydroxides or alkoxides of the above metal ions. The degree of neutralization of the random copolymer by these metal ions is not subject to any particular limitation.

In this invention, the metal ion-neutralized random copolymers are preferably zinc ion-neutralized ionomer resins. Such ionomer resins increase the melt flow rate of the material, facilitate adjustment to the subsequently described optimal melt flow rate, and thus enable the moldability to be improved.

Commercial products may be used in the base resin made up of above components M and N. Examples of commercial products that may be used as the random copolymer in component M include Nucrel 1560, Nucrel 1214 and Nucrel 1035 (all products of DuPont-Mitsui Polychemicals Co., Ltd.); and Escor 5200, Escor 5100 and Escor 5000 (all products of ExxonMobil Chemical). Examples of commercial products that may be used as the random copolymer in component N include Nucrel AN4311 and Nucrel AN4318 (both products of DuPont-Mitsui Polychemicals Co., Ltd.); and Escor ATX325, Escor ATX320 and Escor ATX310 (all products of ExxonMobil Chemical).

Examples of commercial products that may be used as the metal ion-neutralized random copolymer in component M include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (produced by E.I. DuPont de Nemours and Co., Inc.) and Iotek 3110 and Iotek 4200 (both products of ExxonMobil Chemical). Examples of commercial products that may be used as the metal ion-neutralized random copolymer in component N include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours and Co., Inc.), and Iotek 7510 and Iotek 7520 (both products of ExxonMobil Chemical). Examples of zinc-neutralized ionomer resins that can be preferably used as the above metal ion-neutralized random copolymers include Himilan 1706, Himilan 1557 and Himilan AM7316.

When the above-described base resin is prepared, the weight ratio M/N of component M to component N must be set at from 100:0 to 25:75, preferably from 100:0 to 50:50, more preferably from 100:0 to 75:25, and most preferably 100:0. Too little component M lowers the resilience of the molded material.

In addition, the moldability can be further improved by adjusting the relative proportions of random copolymer and metal ion-neutralized random copolymer in the base resin of above components M and N. It is recommended that the ratio of random copolymer to metal ion-neutralized random copolymer be generally from 0:100 to 60:40, preferably from 0:100 to 40:60, more preferably from 0:100 to 20:80, and most preferably 0:100. The presence of too much random copolymer may lower the processability during mixing.

Component P is a non-ionomeric thermoplastic elastomer which is optionally included to further enhance both the feel of the golf ball upon impact and its rebound characteristics. In the invention, the above-described base resin and component P are referred to collectively as the "resin components." Specific examples of non-ionomeric thermoplastic elastomers that may be used as component P include olefin elastomers, styrene elastomers, polyester elastomers, urethane elastomers and polyamide elastomers. The use of an olefin elastomer or a polyester elastomer is preferred for increasing resilience.

Examples of commercial products that may be used as component P include olefin elastomers such as Dynaron (manufactured by JSR Corporation) and polyester elastomers such as Hytrel (manufactured by DuPont-Toray Co., Ltd.).

It is recommended that the amount of component P per 100 parts by weight of the base resin in the material be generally 0 part or more, preferably at least 1 part, more preferably at least 2 parts, even more preferably at least 3 parts, and most preferably at least 4 parts, but not more than 100 parts, preferably not more than 60 parts, more preferably not more than 40 parts, and most preferably not more than 20 parts. Too much component P may lower the compatibility of the mixture and markedly compromise the durability of the golf ball.

Next, component Q is a fatty acid or fatty acid derivative having a molecular weight of 280 to 1,500. This component has a very low molecular weight compared with the base resin and is used to adjust the melt viscosity of the mixture to a suitable level, particularly to help improve flow. Component Q has a relatively high content of acid groups (or derivatives thereof) and can prevent an excessive loss of resilience.

The molecular weight of the fatty acid or fatty acid derivative of component Q is at least 280, preferably at least 300, more preferably at least 330, and most preferably at least 360, but not more than 1,500, preferably not more than 1,000, more preferably not more than 600, and most preferably not more than 500. Too low a molecular weight may prevent a better heat resistance from being achieved, whereas too high a molecular weight may make it impossible to improve flow.

Preferred examples of the fatty acid or fatty acid derivative serving as component Q include unsaturated fatty acids having a double bond or triple bond on the alkyl group as well as derivatives thereof, and saturated fatty acids in which all the bonds on the alkyl group are single bonds as well as derivatives thereof. It is recommended that the number of carbons on the molecule be generally at least 18, preferably at least 20, more preferably at least 22, and most preferably at least 24, but not more than 80, preferably not more than 60, more preferably not more than 40, and most preferably not more than 30. Too few carbons may prevent a better heat resistance from being achieved and may also make the content of acid groups so high as to diminish the flow-enhancing effect on account of interactions between acid groups in component Q and acid groups present in the base resin. On the other hand, too many carbons increases the molecular weight, which may also prevent the desired flow-enhancing effect from being achieved.

Specific examples of fatty acids that may be used as component Q include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

Fatty acid derivatives which may be used as component Q include metallic soaps in which the proton on the acid group of the fatty acid has been substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are preferred.

Specific examples of fatty acid derivatives that may be used as component Q include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Alternatively, it is possible to use in the invention, as the combination of the base resin (above components M and N) with above component Q, a known metallic soap-modified ionomer, including those described in U.S. Pat. No. 5,312,857, U.S. Pat. No. 5,306,760 and International Application WO 98/46671.

Component R is a basic inorganic metal compound which can neutralize acid groups in the base resin and component Q. When a metallic soap-modified ionomer resin (e.g., the metallic soap-modified ionomer resins mentioned in the above-cited prior-art patent publications) is used alone without including component R, the metallic soap and the un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, it adheres to the surface of the molded article, which can substantially lower paint film adhesion.

$$\begin{array}{c} \vert \\ -\!\!\!\!\vert\!\!\!\!- \\ \vert \\ COOH \\ (1) \end{array} + -COO^-X^+ \rightleftharpoons \begin{array}{c} \vert \\ -\!\!\!\!\vert\!\!\!\!- \\ \vert \\ COO^-X^+ \\ (2) \end{array} + -COOH\; (\uparrow) \quad (3)$$

(1) un-neutralized acid group present on the ionomer resin
(2) metallic soap
(3) fatty acid
$X^+$: metal cation Accordingly, a basic inorganic metal compound (component R) which neutralizes acid groups present in the base resin and in component Q is included as an essential ingredient in order to improve the resilience of the molded mantle layer.

That is, incorporating above component R in the material [I] results in a suitable degree of neutralization of the acid groups in the base resin and in component Q. Moreover, optimizing the various components in this way produces synergistic effects which increase the thermal stability of the mixture, impart a good processability and make it possible to enhance the resilience.

It is recommended that the basic inorganic metal compound used as component R be one which has a high reactivity with the base resin and includes no organic acids in the reaction by-products, thus enabling the degree of neutralization of the mixture to be increased without a loss of thermal stability.

Illustrative examples of the metal ions in the basic inorganic metal compound serving as component R include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$ and $Co^{2+}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. A hydroxide or a monoxide is recommended. Calcium hydroxide and magnesium oxide, both of which have a high reactivity with the base resin, are preferred. Calcium hydroxide is especially preferred.

Because the above-described material [I] is arrived at by blending specific respective amounts of components Q and R with the resin components, i.e., the base resin containing specific respective amounts of components M and N in combination with optional component P, this material [I] has excellent thermal stability, flow properties and moldability, and can impart the molded layer with a markedly improved resilience.

Components Q and R are compounded in respective amounts, per 100 parts by weight of the resin components suitably formulated from components M, N and P, of at least 5 parts by weight, preferably at least 10 parts by weight, more preferably at least 15 parts by weight, and most preferably at least 18 parts by weight, but not more than 80 parts by weight, preferably not more than 40 parts by weight, more preferably not more than 25 parts by weight, and most preferably not more than 22 parts by weight, of component Q; and at least 0.1 part by weight, preferably at least 0.5 part by weight, more preferably at least 1 part by weight, and most preferably at least 2 parts by weight, but not more than 10 parts by weight, preferably not more than 8 parts by weight, more preferably not more than 6 parts by weight, and most preferably not more than 5 parts by weight, of component R. Too little component Q lowers the melt viscosity, resulting in inferior processability, whereas too much lowers the durability. Too little component R fails to improve thermal stability and resilience, whereas too much instead lowers the heat resistance of the golf ball-forming material due to the presence of excess basic inorganic metal compound.

In the above-described material [I] which is preferably formulated from the respective above-indicated amounts of the foregoing resin components and components Q and R, it is recommended that at least 50 mol %, preferably at least 60 mol %, more preferably at least 70 mol %, and most preferably at least 80 mol %, of the acid groups be neutralized. A high degree of neutralization such as this makes it possible to more reliably suppress the exchange reactions that cause trouble when only a base resin and a fatty acid or fatty acid derivative are used as in the above-cited prior art, thus preventing the formation of fatty acid. As a result, there is obtained a material of greatly increased thermal stability and good processability which can provide a molded layer of much better resilience than prior-art ionomer resins.

"Degree of neutralization," as used above, refers to the degree of neutralization of acid groups present within the mixture of the base resin and the fatty acid or fatty acid derivative serving as component Q, and differs from the degree of neutralization of the ionomer resin itself when an ionomer resin is used as the metal ion-neutralized random copolymer in the base resin. A mixture according to the invention having a certain degree of neutralization, when compared with an ionomer resin alone having the same degree of neutralization, contains a very large number of metal ions. This large number of metal ions increases the density of ionic crosslinks which contribute to improved resilience, making it possible to confer the molded layer with excellent resilience.

To more reliably achieve a material [I] having both a high degree of neutralization and good flow properties, it is recommended that the acid groups in the above-described mixture be neutralized with transition metal ions and with alkali metal and/or alkaline earth metal ions. Although transition metal ions have a weaker ionic cohesion than alkali metal and alkaline earth metal ions, the combined use of these different types of ions to neutralize acid groups in the mixture can provide a substantial improvement in the flow properties.

It is recommended that the molar ratio between the transition metal ions and the alkali metal and/or alkaline earth metal ions be within a range of generally 10:90 to 90:10, preferably 20:80 to 80:20, more preferably 30:70 to 70:30, and most preferably 40:60 to 60:40. Too low a molar ratio of transition metal ions may fail to provide sufficient improvement in the flow properties of the material. On the other hand, a transition metal ion molar ratio that is too high may lower the resilience of the mantle.

Specific, non-limiting, examples of the metal ions include zinc ions as the transition metal ions and at least one type of ion selected from among sodium, lithium and magnesium ions as the alkali metal or alkaline earth metal ions.

A known method may be used to obtain a mixture in which the desired amount of acid groups have been neutralized with transition metal ions and alkali metal or alkaline earth metal ions. Specific examples of methods of neutralization with transition metal ions, particularly zinc ions, include the use of zinc soaps as the fatty acid derivative, the use of zinc ion-neutralized products (e.g., zinc ion-neutralized ionomer resins) when formulating component M and component N as the base resin, and the use of zinc compounds such as zinc oxide as the basic inorganic metal compound of component R.

The above-described material [I] may include also suitable amounts of any additives that may be required for the intended use of the material. For example, if the material is to be used as a cover stock, such additives as pigments, dispersants, antioxidants, ultraviolet absorbers and light stabilizers may be added to the essential ingredients described above. When such additives are included in the composition, they may be incorporated in an amount, per 100 parts by weight of the essential ingredients of material [I] (the resin components and components Q and R), of preferably at least 0.1 part by weight, more preferably at least 0.5 part by weight, and most preferably at least 1 part by weight, but not more than 10 parts by weight, preferably not more than 6 parts by weight, and most preferably not more than 4 parts by weight.

The foregoing material [I] may be obtained by preparing a mixture of the above-described essential ingredients and whatever optional ingredients may be needed, then heating and working the mixture under suitable conditions, such as a heating temperature of 150 to 250° C. and using an internal mixer such as a kneading-type twin-screw extruder, a Banbury mixer or a kneader. Any suitable method may be used without particular limitation to blend various additives with the above essential ingredients of the invention. For example, the additives may be combined with the essential ingredients, and heating and mixture of all the ingredients carried out at the same time. Alternatively, the essential ingredients may first be heated and mixed, following which the optional additives may be added and the overall composition subjected to additional heating and mixture.

This material [I] should have a melt flow rate adjusted to ensure flow properties that are particularly suitable for injection molding and thus improve moldability. Specifically, it is recommended that the melt flow rate, as measured according to JIS-K7210 at a temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and most preferably not more than 3 dg/min. Too large or small a melt flow rate may result in a marked decline in melt processability.

It is preferable also for material [I] to have, in infrared absorption spectroscopy, an appropriate absorbance at the absorption peak attributable to carboxylate anion stretching vibrations normally detected at 1530 to 1630 $cm^{-1}$ relative to the absorbance at the absorption peak attributable to carbonyl stretching vibrations normally detected at 1690 to 1710 $cm^{-1}$. For the sake of clarity, this ratio may be expressed as follows: (absorbance of absorption peak for carboxylate anion stretching vibrations)/(absorbance of absorption peak for carbonyl stretching vibrations).

Here, "carboxylate anion stretching vibrations" refers to vibrations by carboxyl groups from which the proton has dissociated (metal ion-neutralized carboxyl groups), whereas "carbonyl stretching vibrations" refers to vibrations by undissociated carboxyl groups. The ratio between these respective peak intensities depends on the degree of neutralization. In the ionomer resins having a degree of neutralization of about 50 mol % which are commonly used, the ratio between these peak absorbances is about 1:1.

To improve the thermal stability, flow, processability and resilience of the material [I] used in the invention, it is recommended that the material have a carboxylate anion stretching vibration peak absorbance which is at least 1.3 times, preferably at least 1.5 times, and most preferably at least 2 times, the carbonyl stretching vibration peak absorbance. The absence of any carbonyl stretching vibration peak is especially preferred.

The thermal stability of material [I] can be measured by thermogravimetry. It is recommended that, in thermogravimetry, the composition have a weight loss at 250° C., based on the weight of the material at 25° C., of generally not more than 2 wt %, preferably not more than 1.5 wt %, and most preferably not more than 1 wt %.

It is recommended that material [I] be formulated such that the molded layer obtained therefrom has a Durometer D hardness of generally at least 50, preferably at least 53, more preferably at least 56, and most preferably at least 58, but preferably not more than 70, more preferably not more than 65, and most preferably not more than 62. If the Durometer D hardness is too high, the resulting golf ball may have a markedly diminished feel upon impact. On the other hand, too low a hardness may reduce the rebound of the ball.

The specific gravity of material [I] is not subject to any particular limitation, although it is recommended that the specific gravity be generally at least 0.9 g/cm$^3$, preferably at least 0.92 g/cm$^3$, and most preferably at least 0.94 g/cm$^3$, but not more than 1.2 g/cm$^3$, preferably not more than 1.1 g/cm$^3$, and most preferably not more than 1.05 g/cm$^3$.

Material [II] may include above components M, N, P, Q and R in the same types and amounts as are used in material [I]. However, material [II] differs from material [I] in that it may use either component M or component N alone, or may use both together. If components M and N are both included in material [II], they may be used in a weight ratio of from 90:10 to 10:90, and particularly from 80:20 to 20:80.

Material [II] additionally includes, as component S, a compound which has a molecular weight of not more than 20,000 and bears at least two reactive functional groups.

Exemplary compounds which have a molecular weight of not more than 20,000 and bear at least two reactive functional groups include monomers, oligomers and macromonomers which have a total of at least two reactive functional groups of one or more types on each molecule and a molecular weight of not more than 20,000, and preferably not more than 5,000. The number of reactive functional groups, while not subject to any particular upper limit, is generally 6 or less.

"Monomer" is used here in the usual sense of a compound employed as a basic building block in polymer synthesis. "Oligomer" refers to a low-molecular-weight product which is obtained from monomers commonly employed in polymer synthesis and which contains generally at least two monomer units and has a molecular weight of up to several thousand. "Macromonomer" refers to a material which is an oligomer having polymerizable functional groups at the ends and which is employed in the synthesis of graft polymers by the copolymerization of different functional comonomers. Monomers, oligomers and macromonomers generally serve as intermediates in the synthesis of plastics and elastomers, or are used as starting materials for the production of graft polymers. Notable use is being made recently of oligomers and macromonomers having various functional groups.

The reactive functional groups are not subject to any particular limitation, insofar as they are capable of improving adhesion between layers of the golf ball. Preferred examples of reactive functional groups include hydroxyl groups, amino groups, carboxyl groups and epoxy groups. In the case of a blend with an ionomer resin, hydroxyl groups are especially preferred because they have a limited impact on the melt flow rate.

Illustrative, non-limiting, examples of suitable monomers include 1,3-butanediol, 1,6-hexanediol, trimethylolpropane, mannitol, sorbitol and polysaccharides. Illustrative, non-limiting examples of suitable oligomers and macromonomers include polyethylene glycol, polyhydroxypolyolefin oligomers, modified low-molecular-weight polyethylene, modified low-molecular-weight polypropylene, modified low-molecular-weight polystyrene and modified liquid rubber. Polyhydroxypolyblefin oligomers and trimethylolpropane are especially preferred. These may be used singly or in combinations of two types thereof, as desired.

The above monomer, oligomer or macromonomer may be a commercially available product, such as trimethylolpropane produced by Mitsubishi Gas Chemical Co., Ltd. or the polyhydroxypolyolefin oligomers having 150 to 200 backbone carbons and hydroxyl end groups produced under the trade name Polytail H by Mitsubishi Chemical Corporation.

The amount of compound having at least two reactive functional groups included in material [II] per 100 parts by weight of the resin components is preferably 0.1 to 100 parts by weight, preferably 0.2 to 50 parts by weight, more preferably 0.3 to 20 parts by weight, even more preferably 0.4 to 10 parts by weight, and most preferably 0.5 to 5 parts by weight. If too little of this compound is included, the desired effects of addition may not be achieved. On the other hand, the addition of too much may lower the physical properties of the golf ball.

The foregoing material [II] may be obtained by preparing a mixture of the above-described essential ingredients and whatever optional ingredients may be needed, then heating and working the mixture under suitable conditions, such as a heating temperature of 150 to 250° C. and using an internal mixer such as a kneading-type twin-screw extruder, a Banbury mixer or a kneader. Any suitable method may be used without particular limitation to blend various additives with the above essential ingredients of the invention. For example, the additives may be combined with the essential ingredients, and heating and mixture of all the ingredients carried out at the same time. Alternatively, the essential ingredients may first be heated and mixed, following which the optional additives may be added and the overall composition subjected to additional heating and mixture.

This material [II] should have a melt flow rate adjusted to ensure flow properties that are particularly suitable for injection molding and thus improve moldability. Specifically, it is recommended that the melt flow rate, as measured according to JIS-K7210 at a temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and most preferably not more than 3 dg/min. Too large or small a melt flow rate may result in a marked decline in melt processability.

It is advantageous for material [II] to have a specific gravity of from 0.9 to 1.2, preferably from 0.92 to 1.1, and most preferably from 0.93 to 1.05.

Moreover, it is desirable for material [II] to have a Durometer D hardness of at least 40, preferably at least 45, and most preferably at least 50, but not more than 70, preferably not more than 65, and most preferably not more than 60.

This material [II] can impart good adhesion by virtue of the reaction of reactive functional groups on component S with functional groups on other materials.

At least one layer of the mantle may be made primarily of a thermoplastic polyester, suitable examples of which include those produced by DuPont-Toray Co., Ltd. under the trade name Hytrel.

In particular, when the mantle is composed of two layers—an inner layer and an outer layer, to achieve a golf ball having both a soft feel upon impact and a high rebound, it is desirable for either the inner layer or the outer layer to be made primarily of the above-described thermoplastic polyester and for the other layer to be made of material [I] or [II].

Regardless of whether the mantle is composed of a single layer or of two or more layers, it is advantageous for each layer of the mantle to have a Durometer D hardness of at least 30, and preferably at least 35, but not more than 70, and preferably not more than 65. To achieve a golf ball having both a soft feel on impact and a high rebound, it is desirable for the mantle layer in contact with the subsequently described golf ball cover to have a Durometer D hardness of at least 45, and preferably at least 50, but not more than 70, preferably not more than 65, and most preferably not more than 63.

When the mantle is composed of an inner layer and an outer layer, as just noted, it is preferable for the outer layer to have a Durometer D hardness of 45 to 70. The inner layer of the mantle may have higher or lower hardness than the outer layer, although to ensure a soft feel upon impact, it is desirable for the inner layer to be softer than the outer layer.

Regardless of whether the mantle is composed of a single layer or of two or more layers, each layer has a thickness of at least 0.5 mm, and preferably at least 0.8 mm, but not more than 2.0 mm, and preferably not more than 1.8 mm. If the mantle is composed of two or more layers (such as an inner layer/outer layer construction), it is desirable for the overall mantle thickness to be at least 1.0 mm, and preferably at least 1.5 mm, but not more than 4.0 mm, and preferably not more than 3.5 mm.

The cover of the inventive golf ball is composed primarily of a thermoplastic polyurethane formulated at least in part of the following material G.

(G) Thermoplastic Polyurethane Material

The thermoplastic polyurethane material has a structure which is composed of soft segments made of a polymeric polyol (polymeric glycol), hard segments made of a chain extender, and a diisocyanate. Here, the polymeric polyol used as a starting material is not subject to any particular limitation, and may be any that is used in the prior art relating to thermoplastic polyurethane materials. Exemplary polymeric polyols include polyester polyols and polyether polyols, although polyether polyols are better than polyester polyols for synthesizing thermoplastic polyurethane materials having a high resilience and excellent low-temperature properties. Suitable polyether polyols include polytetramethylene glycol and polypropylene glycol. Polytetramethylene glycol is especially preferred for achieving a good resilience and good low-temperature properties. The polymeric polyol has an average molecular weight of preferably 1,000 to 5,000. To synthesize a thermoplastic polyurethane material having a high resilience, an average molecular weight of 2,000 to 4,000 is especially preferred.

Preferred chain extenders include those used in the prior art relating to thermoplastic polyurethane materials. Illustrative, non-limiting, examples include 1,4-butylene glycol, 1,2-ethylene glycol, 1,3-butanediol, 1,6-hexanediol and 2,2-dimethyl-1,3-propanediol. These chain extenders have an average molecular weight of preferably 20 to 15,000.

Preferred diisocyanates include those used in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. Depending on the type of isocyanate used, the crosslinking reaction during injection molding may be difficult to control. To ensure stability of the reaction between the thermoplastic polyurethane material G and the subsequently described isocyanate mixture H, it is most preferable to use 4,4'-diphenylmethane diisocyanate.

Commercially available products may be suitably used as the above-described thermoplastic polyurethane material. Illustrative examples include Pandex T8290, Pandex T8295 and Pandex T8260 (all manufactured by DIC Bayer Polymer, Ltd.), and Resamine 2593 and Resamine 2597 (both manufactured by Dainichi Seika Colour & Chemicals Mfg. Co., Ltd.).

The above-described thermoplastic polyurethane material G may be used by itself. However, to further enhance the resilience and scuff resistance of the cover, it is preferable for the cover to be made of a composition [III] consisting essentially of:

(G) the above-described thermoplastic polyurethane material, and (H) an isocyanate mixture obtained by dispersing (h1) an isocyanate compound bearing as functional groups at least two isocyanate groups per molecule in (h2) a thermoplastic resin which substantially does not react with isocyanate.

(H) Isocyanate Mixture

The isocyanate mixture H is prepared by dispersing (h1) an isocyanate compound bearing as functional groups at least two isocyanate groups per molecule in (h2) a thermoplastic resin which substantially does not react with isocyanate. Preferred isocyanate compounds (h1) include those used in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. To ensure good reactivity and good safety during production, it is most preferable to use 4,4'-diphenylmethane diisocyanate.

The above-described thermoplastic resin h2 is preferably a resin having a low water absorption and excellent compatibility with thermoplastic polyurethane materials. Illustrative examples of such resins include polystyrene resins, polyvinyl chloride resins, ABS resins, polycarbonate resins, and polyester elastomers (e.g., polyetherester block copolymers, polyesterester block copolymers). For good resilience and strength, polyester elastomers, and especially polyetherester block copolymers, are preferred.

The weight ratio of the thermoplastic resin h2 to the isocyanate compound h1 in the isocyanate mixture H is preferably from 100:5 to 100:100, and most preferably from 100:10 to 100:40. If the amount of isocyanate compound h1 relative to the amount of thermoplastic resin h2 is too small, more isocyanate mixture H must be added to achieve an amount of addition sufficient for the crosslinking reaction with the thermoplastic polyurethane material G. As a result, the thermoplastic resin h2 exerts too large an influence, causing the composition [III] to have inadequate properties. On the other hand, if the amount of isocyanate is too large, the isocyanate compound h1 causes slippage to occur during kneading, making the isocyanate mixture H difficult to prepare.

The isocyanate mixture H can be prepared by, for example, mixing the isocyanate compound h1 into the thermoplastic resin h2 and thoroughly kneading these together with mixing rollers or in a Banbury mixer at a temperature of 130 to 250° C., and either pelletizing the mixture or cooling then milling it. An example of a commercially available product that may be suitably used as the isocyanate mixture H is Crossnate EM30 (produced by Dainichi Seika Colour & Chemicals Mfg. Co., Ltd.).

Composition [III]

Composition [III] consists essentially of the thermoplastic polyurethane material G and isocyanate mixture H described above. The composition contains these components in a weight ratio of the thermoplastic polyurethane material G to the isocyanate mixture H within a range of preferably 100:1 to 100:100, more preferably 100:5 to 100:50, and most preferably 100:10 to 100:30. If the amount of isocyanate mixture H included in composition [III] relative to the thermoplastic polyurethane material G is too small, a sufficient degree of crosslinking will not occur. On the other hand, if the amount of isocyanate mixture H is too large, unreacted isocyanate may cause discoloration of the molded golf ball cover.

In addition to the above-described components, the cover stock may contain also other ingredients, such as thermoplastic polymeric materials other than thermoplastic polyurethane materials. Illustrative examples of such thermoplastic polymeric materials that may also be used include polyester elastomers, polyamide elastomers, ionomer resins, styrene block elastomers, polyethylene and nylon resins. The amount in which such thermoplastic polymeric materials other than thermoplastic polyurethane materials are included, per 100 parts by weight of the thermoplastic polyurethane material serving as the essential component therein, is generally 0 to 100 parts by weight, preferably 10 to 75 parts by weight, and most preferably 10 to 50 parts by weight. This amount may be selected as appropriate for such purposes as adjusting the hardness and increasing the resilience of the molded cover, enhancing the flow properties of the cover stock, and improving adhesion of the cover to the underlying mantle layer. If necessary, the cover stock may have added thereto various additives, such as pigments, dispersants, antioxidants, light stabilizers, ultraviolet absorbers and parting agents.

The cover on the inventive golf ball can be formed by, for example, adding an isocyanate mixture H to the thermoplastic polyurethane material G and dry mixing, then molding the resulting mixture around the ball precursor (core+mantle) in an injection molding machine. The molding temperature varies according to the type of thermoplastic polyurethane material G, although molding is generally carried out at a temperature within a range of 150 to 250° C.

The reactions and crosslinking which take place in the golf ball cover obtained as described above are believed to involve the reaction of isocyanate groups with hydroxyl groups remaining on the thermoplastic polyurethane material to form urethane bonds, or addition reactions by isocyanate groups at the urethane groups on the thermoplastic polyurethane to form allophanate or biuret crosslinks. Right after the thermoplastic polyurethane composition used as the cover stock is injection molded, crosslinking has not yet proceeded to a sufficient degree. However, the crosslinking reaction can be made to proceed further by carrying out an annealing step after molding, so as to ensure that those characteristics useful in a golf ball cover are maintained. "Annealing," as used herein, refers to heat aging the cover at a constant temperature for a fixed length of time, or aging the cover for a fixed period at room temperature.

It is desirable for the cover material to have a surface hardness, as measured with a Shore Durometer using indenter D in accordance with JIS K6253, of 40 to 60, preferably 43 to 60, and most preferably 45 to 55. A cover having too low a surface hardness may result in excessive backspin on shots taken with an iron, making the ball difficult to control. On the other hand, a cover having too high a surface hardness may result in a less than satisfactory back spin on shots with an iron, thereby lowering controllability, and may also give the ball a poor feel on impact.

It is desirable for the cover material to have a resilience, as measured according to JIS-K7311, of at least 45%, preferably 45 to 85%, more preferably 50 to 80%, and most preferably 50 to 60%. Thermoplastic polyurethane materials are not materials known for having a particularly outstanding resilience, and so strict selection of the resilience is desirable. A cover material having too low a resilience may result in a substantial decline in the carry of the golf ball. On the other hand, a cover material with too high a resilience may give the ball excessive initial velocity on shots of less than 100 yards that require good control and in putting, and may have a feel on impact that does not agree with the golfer.

The cover composed primarily of the above-described thermoplastic polyurethane has a Durometer D hardness of at least 40, and preferably at least 42, but not more than 60, and preferably not more than 58. This cover hardness is lower than the hardness of the mantle layer in contact with the cover, thereby enhancing the spin characteristics on approach shots and softening the feel upon impact with a putter.

It is advantageous for the cover to have a Durometer D hardness Hc and the mantle layer in contact with the cover to have a Durometer D hardness Hi such that the difference Hi−Hc is at least 1, and preferably at least 3, but not more than 20, and preferably not more than 15.

It is also advantageous for the cover to have a thickness of at least 0.5 mm, and preferably at least 0.7 mm, but not more than 2.5 mm, and preferably not more than 2.3 mm.

The golf ball of the invention can be manufactured in accordance with the Rules of Golf for use in competitive play, in which case the ball may be formed to a diameter of not less than 42.67 mm and a weight of not more than 45.93 g. It is recommended that the diameter of the golf ball have an upper limit of preferably not more than 44.0 mm, more preferably not more than 43.5 mm, and most preferably not more than 43.0 mm. It is also recommended that the weight of the golf ball have a lower limit of preferably not less than 44.5 g, more preferably not less than 45.0 g, even more preferably not less than 45.1 g, and most preferably not less than 45.2 g.

It is desirable for the golf ball hardness to be such that, when the ball is subjected to a load of 980 N (100 kgf), it undergoes a deflection of 2.0 to 4.0 mm, and preferably 2.2 to 3.8 mm.

The construction, composition of the respective layers and other features described in detail above provide the golf balls of the invention with an excellent rebound.

EXAMPLES

The following examples and comparative examples are given by way of illustration and not by way of limitation.

Examples 1 to 8, Comparative Examples 1 to 4

Golf ball cores of the diameters and hardnesses shown in Table 3 were produced by using the rubber compositions shown in Table 1 and vulcanizing at 155° C. for 17 minutes.

Next, in each example, a mantle inner layer and a mantle outer layer of the respective formulations shown in Table 2 were formed by injection molding. A cover was then injection molded over the mantle outer layer, thereby forming golf balls having the mantle and cover characteristics shown in Table 3. The flight performance, spin performance, feel on impact and scuff resistance of each of the golf balls thus obtained were evaluated as described below. The results are given in Table 3.

Core and Ball Hardness: Measured as the deflection (mm) when subjected to a load of 980 N (100 kg).

Mantle and Cover Hardness: The Durometer D hardness, as measured in accordance with JIS K6253.

Flight Performance: The initial velocity, spin rate, carry and total distance for each golf ball was measured when the ball was struck at a head speed of 45 m/s (HS 45) with a driver (W#1) mounted on a swing machine. The test was conducted at a temperature of 23° C. The club used was a Tour Stage X500 made by Bridgestone Sports Co., Ltd., and having a loft angle of 9 degrees and an X shaft.

Spin Performance on Approach Shot: The spin rate of the ball when hit at a head speed of 20 m/s using a sand wedge (Tour Stage, made by Bridgestone Sports Co., Ltd.) mounted on a swing machine was measured. The test was conducted at a temperature of 23° C.

Feel: The feel of each ball when hit with a driver (W#1) and a putter was rated by five top-caliber amateur golfers as "soft" (most desirable), "ordinary," or "hard" (least desirable). The rating assigned most often to a particular ball was used as that ball's overall rating.

Scuff Resistance: The ball was temperature conditioned to 23° C., then hit at a head speed of 33 m/s with a pitching wedge mounted on a swing machine. After being hit, the ball was examined visually for signs of damage. The scuff resistance was rated as follows.

Good: Damage was not observed, or was of such a limited degree as to pose no impediment to further use of the ball.

Not good (NG): Considerable damage, such as surface scuffing and loss of dimples.

TABLE 1

| Ingredients (pbw) | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Polybutadiene | HCBN-13 | 100 | 100 | 100 | 100 | 100 | 100 | 100 | 100 | | | | |
| | BR01 | | | | | | | | | 50 | 50 | 50 | 50 |
| | BR11 | | | | | | | | | 50 | 50 | 50 | 50 |
| Peroxide | (a) Perhexa 3M-40 | 0.3 | 0.3 | 0.3 | 0.3 | 0.3 | 0.3 | 0.3 | 0.3 | 0.6 | 0.6 | 0.6 | 0.6 |
| | (b) Percumil D | 0.3 | 0.3 | 0.3 | 0.3 | 0.3 | 0.3 | 0.3 | 0.3 | 0.6 | 0.6 | 0.6 | 0.6 |
| Antioxidant | Nocrac NS-6 | 0.1 | 0.1 | 0.1 | 0.1 | 0.1 | 0.10 | 0.1 | 0.1 | 0.1 | 0.1 | 0.1 | 0.1 |
| | Zinc oxide | 20.94 | 20.94 | 22.35 | 20.94 | 22.35 | 21.7 | 20.94 | 25.2 | 20.94 | 20.24 | 20.94 | 19.5 |
| | Zinc acrylate | 33.0 | 33.0 | 27.3 | 33.0 | 27.3 | 29.5 | 33.0 | 26.1 | 33.0 | 35.8 | 33.0 | 34.4 |
| | Zinc salt of pentachlorothiophenol | 1.0 | 1.0 | 1.0 | 1.0 | 1.0 | 1.0 | 1.0 | 1.0 | 1.0 | 1.0 | 1.0 | 1.0 |

BR01: A polybutadiene produced by JSR Corporation. Cis-1,4 unit content, 96%. Mooney viscosity ($ML_{1+4}$ (100° C.)), 44. Polydispersity Mw/Mn, 4.2. Catalyst, nickel. Solution viscosity, 150 mPa·s.

BR11: A polybutadiene produced by JSR Corporation. Cis-1,4 unit content, 96%. Mooney viscosity ($ML_{1+4}$ (100° C.)), 44. Polydispersity Mw/Mn, 4.1. Catalyst, nickel. Solution viscosity, 270 mPa·s.

HCBN-13: Produced by JSR Corporation. Cis-1,4 unit content, 96%. Mooney viscosity ($ML_{1+4}$ (100° C.)), 53. Polydispersity Mw/Mn, 3.2. Catalyst, neodymium.

Perhexa 3M-40: Produced by NOF Corporation. Perhexa 3M-40 is a 40% dilution. The amount of addition is the effective weight of the 1,1-bis(t-butylperoxy)-3,3,5-trimethylcyclohexane in the dilution added.

Percumil D: Produced by NOF Corporation. Dicumyl peroxide.

Nocrac NS-6: 2,2'-Methylenebis(4-methyl-6-t-butylphenol) produced by Ouchi Shinko Chemical Industry Co., Ltd.

TABLE 2

| Ingredients (pbw) | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Mantle inner layer | | | | | | | | | | | | |
| Himilan 1605 | | | | | 65 | | | | | | | |
| Dynaron 6100P | | | | | 35 | | | | | | | |
| Behenic acid | | | | | 20 | | | | | | | |
| Calcium hydroxide | | | | | 2.4 | | | | | | | |
| Hytrel 4047 | 100 | | | 100 | | | | | 100 | | | |
| Hytrel 4067 | | 100 | | | | | | | | 100 | | |
| Hytrel 5557 | | | 100 | | | | | | | | | |
| Mantle outer layer | | | | | | | | | | | | |
| Hytrel 1605 | 65 | 65 | 65 | | | 65 | 65 | 65 | 40 | 40 | | 40 |
| Dynaron 6100P | 35 | 35 | 35 | 25 | | 35 | 35 | 35 | | | | |
| Himilan 1706 | | | | | | | | | 40 | 40 | | 40 |
| HSB 1516 | | | | | | | | | 20 | 20 | | 20 |
| Hytrel 5557 | | | | | 100 | | | | | | | |
| Surlyn 8120 | | | | 75 | | | | | | | | |
| Surlyn 7930 | | | | | | | | | | | 60 | |
| Surlyn 6320 | | | | | | | | | | | 35 | |
| Nucrel 9-1 | | | | | | | | | | | 5 | |
| Behenic acid | 20 | 20 | 20 | 20 | | 20 | 20 | 20 | | | | |
| Calcium hydroxide | 2.4 | 2.4 | 2.4 | 2.3 | | 2.4 | 2.4 | 2.4 | | | | |
| Cover | | | | | | | | | | | | |
| Pandex T8260 | | | | | | | | | | 100 | | |
| Pandex T8295 | 100 | 100 | 100 | | 100 | 100 | 100 | | 100 | | | |
| Crossnate EM30 | 15 | 15 | 15 | | 15 | 15 | 15 | | | | | |
| Surlyn 7930 | | | | | | | | | | | 60 | |
| Surlyn 6320 | | | | | | | | | | | 35 | |
| Nucrel 9-1 | | | | | | | | | | | 5 | |
| Titanium dioxide | 2 | 2 | 2 | | 2 | 2 | 2 | 2 | 2 | 2 | 2 | 2 |

Himilan 1605: A sodium ion-neutralized ethylene/methacrylic acid copolymer ionomer produced by DuPont-Mitsui Polychemicals Co., Ltd.

Dynaron 6100P: A block copolymer having crystalline olefin blocks. Produced by JSR Corporation.

Hytrel 4047, 4067, 5557: Polyester elastomers produced by DuPont-Toray Co., Ltd.

Himilan 1706: A zinc ion-neutralized ethylene/methacrylic acid copolymer ionomer produced by DuPont-Mitsui Polychemicals Co., Ltd.

HSB 1561: A block polymer having terminal amino groups. Produced by JSR Corporation.

Surlyn 8120, 7930, 6320: Ionomer resins produced by E.I. DuPont de Nemours and Company.

Nucrel 9-1: A ternary acid copolymer produced by E.I. DuPont de Nemours and Company.

Pandex T8260, T8295: Thermoplastic polyurethane elastomers produced by DIC Bayer Polymer, Ltd.

Crossnate EM30: Produced by Dainichi Seika Colour & Chemicals Mfg. Co., Ltd.

TABLE 3

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Core | Diameter (mm) | 35.3 | 35.3 | 35.3 | 35.3 | 35.3 | 37.2 | 37.2 | 36.4 | 35.3 | 35.3 | 37.2 | 37.2 |
| | Hardness (mm) | 3.1 | 3.1 | 3.5 | 3.1 | 3.5 | 3.3 | 3.1 | 4.3 | 3.1 | 2.9 | 3.1 | 3.0 |
| Mantle inner layer | Thickness (mm) | 1.20 | 1.20 | 1.20 | 1.20 | 1.20 | — | — | — | 1.20 | 1.20 | — | — |
| | Durometer D hardness | D40 | D47 | D55 | D40 | D56 | — | — | — | D40 | D47 | — | — |
| Mantle outer layer | Thickness (mm) | 1.40 | 1.40 | 1.40 | 1.40 | 1.40 | 1.65 | 1.65 | 1.65 | 1.40 | 1.40 | 1.65 | 1.65 |
| | Durometer D hardness | D56 | D56 | D56 | D52 | D55 | D56 | D56 | D56 | D56 | D56 | D53 | D57 |
| Cover | Thickness (mm) | 1.1 | 1.1 | 1.1 | 1.1 | 1.1 | 1.1 | 1.1 | 1.5 | 1.1 | 1.1 | 1.1 | 1.1 |
| | Durometer D hardness | D53 | D53 | D53 | D50 | D53 | D50 | D53 | D53 | D53 | D53 | D58 | D53 |

TABLE 3-continued

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Ball | Diameter (mm) | 42.7 | 42.7 | 42.7 | 42.7 | 42.7 | 42.7 | 42.7 | 42.7 | 42.7 | 42.7 | 42.7 | 42.7 |
| | Weight (g) | 45.3 | 45.3 | 45.3 | 45.3 | 45.3 | 45.3 | 45.3 | 45.3 | 45.3 | 45.3 | 45.3 | 45.3 |
| | Hardness (mm) | 2.7 | 2.6 | 2.8 | 2.9 | 3.0 | 2.8 | 2.6 | 3.3 | 2.7 | 2.4 | 2.4 | 2.4 |
| Flight | Initial velocity(m/s) | 68.1 | 68.1 | 67.8 | 67.6 | 67.6 | 68.2 | 68.2 | 67.4 | 67.4 | 67.6 | 67.7 | 67.6 |
| Driver | Spin (rpm) | 2900 | 3000 | 2900 | 2972 | 3070 | 2870 | 2712 | 2780 | 2980 | 3200 | 3050 | 3120 |
| HS 45 | Carry (m) | 218.2 | 217.3 | 218.8 | 217.4 | 216.3 | 221.9 | 223.1 | 216.6 | 214.2 | 215.3 | 218.3 | 217.1 |
| (23° C.) | Total distance(m) | 242.1 | 240.5 | 242.5 | 241.2 | 238.5 | 242.6 | 244.1 | 238.1 | 237.5 | 237.8 | 240.2 | 239.5 |
| Spin on approach shot (rpm) | | 6831 | 6886 | 6679 | 6841 | 6790 | 6731 | 6830 | 6630 | 6816 | 6793 | 5980 | 6540 |
| Feel | Driver | soft | soft | soft | soft | soft | soft | soft | soft | soft | hard | hard | hard |
| | Putter | soft | soft | soft | soft | soft | soft | soft | soft | soft | hard | hard | hard |
| Scuff resistance | | good | good | good | good | good | good | good | good | NG | NG | NG | NG |

Japanese Patent Application No. 2002-349726 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A multi-piece solid golf ball comprising a solid core, a mantle of at least one layer and a cover, wherein
   the core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) one or more organic sulfur compounds selected from the group consisting of thiophenols, thionaphthols, halogenated thiophenols, and metal salts thereof, (D) an inorganic filler and (E) 0.1 to 0.8 parts by weight of organic peroxide, has a diameter of 30 to 40 mm and has a deflection when subjected to a load of 980 N (100 kg) of 2.5 to 6.0 mm;
   the mantle is made primarily of a thermoplastic resin, has a thickness of at least 0.5 mm, has a Durometer D hardness of 30 to 70, and includes an outermost layer which is in contact with the cover and has a specific Durometer D hardness;
   the cover is made primarily of a thermoplastic polyurethane, has a thickness of 0.5 to 2.5 mm and has a Durometer D hardness of 40 to 60 which is lower than the Durometer D hardness of the outermost layer of the mantle; and
   the golf ball has a deflection when subjected to a load of 980 N (100 kg) of 2.0 to 4.0 mm.

2. The golf ball of claim 1, wherein the outermost layer of the mantle in contact with the cover has a Durometer D hardness of 45 to 70.

3. The golf ball of claim 1, wherein the polybutadiene in the base rubber of the rubber composition is a modified polybutadiene rubber synthesized using a neodymium catalyst, followed by reaction with a terminal modifier.

4. The golf ball of claim 1, wherein at least one layer of the mantle is made primarily of a thermoplastic polyester.

5. A four-piece solid golf ball comprising a solid core, a two-layer mantle and a cover, wherein
   the core is obtained by molding a vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) one or more organic sulfur compounds selected from the group consisting of thiophenols, thionaphthols, halogenated thiophenols, and metal salts thereof, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm;
   the mantle is composed of an inner layer and an outer layer which is in contact with the cover, each of the two layers being made of a thermoplastic resin, having a thickness of 0.5 to 2 mm and having a Durometer D hardness of 30 to 70;
   the cover is made primarily of a thermoplastic polyurethane, has a thickness of 0.5 to 2.5 mm and has a Durometer D hardness of 40 to 60 which is lower than the Durometer D hardness of the outer layer of the mantle; and
   the golf ball has a deflection when subjected to a load of 980 N (100 kg) of 2.0 to 4.0 mm.

6. The golf ball of claim 5, wherein the outer layer of the mantle in contact with the cover has a Durometer D hardness of 45 to 70.

7. The golf ball of claim 5, wherein the polybutadiene in the base rubber of the rubber composition is a modified polybutadiene rubber synthesized using a neodymium catalyst, followed by reaction with a terminal modifier.

8. The golf ball of claim 5, wherein the outer layer of the mantle is made primarily of a thermoplastic polyester.

9. The golf ball of claim 5, wherein the inner layer of the mantle is made primarily of a thermoplastic polyester.

10. A multi-piece solid golf ball comprising a solid core, a mantle of at least one layer and a cover, wherein
    the core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 parts by weight of organic peroxide, has a diameter of 30 to 40 mm and has a deflection when subjected to a load of 980 N (100 kg) of 2.5 to 6.0 mm;

the mantle is made primarily of a thermoplastic resin, has a thickness of at least 0.5 mm, has a Durometer D hardness of 30 to 70, and includes an outermost layer which is in contact with the cover and has a specific Durometer D hardness;

the cover is made primarily of a thermoplastic polyurethane, has a thickness of 0.5 to 2.5 mm and has a Durometer D hardness of 40 to 60 which is lower than the Durometer D hardness of the outermost layer of the mantle; and the golf ball has a deflection when subjected to a load of 980 N (100 kg) of 2.0 to 4.0 mm, wherein the rubber composition from which the core includes:

(A) 100 parts by weight of a base rubber, (B) 10 to 60 parts by weight of an unsaturated carboxylic acid or an unsaturated carboxylic acid metal salt or both, (C) 0.1 to 5 parts by weight of an organic sulfur compound, (D) 5 to 80 parts by weight of an inorganic filler, and (E) at least two different organic peroxides.

11. A multi-piece solid golf ball comprising a solid core, a mantle of at least one layer and a cover, wherein the core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 parts by weight of organic peroxide, has a diameter of 30 to 40 mm and has a deflection when subjected to a load of 980 N (100 kg) of 2.5 to 6.0 mm;

the mantle is made primarily of a thermoplastic resin, has a thickness of at least 0.5 mm, has a Durometer D hardness of 30 to 70, and includes an outermost layer which is in contact with the cover and has a specific Durometer D hardness;

the cover is made of a composition consisting essentially of:

(G) a thermoplastic polyurethane material, and (H) an isocyanate mixture obtained by dispersing (h1) an isocyanate compound bearing as functional groups at least two isocyanate groups per molecule in (h2) a thermoplastic resin which substantially does not react with isocyanate, and has a thickness of 0.5 to 2.5 mm and has a Durometer D hardness of 40 to 60 which is lower than the Durometer D hardness of the outermost layer of the mantle; and the golf ball has a deflection when subjected to a load of 980 N (100 kg) of 2.0 to 4.0 mm.

12. A multi-piece solid golf ball comprising a solid core, a mantle of at least one layer and a cover, wherein the core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur, (D) an inorganic filler and (E) 0.1 to 0.8 parts by weight of organic peroxide, has a diameter of 30 to 40 mm and has a deflection when subjected to a load of 980 N (100 kg) of 2.5 to 6.0 mm;

the mantle is made primarily of a thermoplastic resin, has a thickness of at least 0.5 mm, has a Durometer D hardness of 30 to 70, and includes an outermost layer which is in contact with the cover and has a specific Durometer D hardness;

the cover is made primarily of a thermoplastic polyurethane, has a thickness of 0.5 to 2.5 mm and has a Durometer D hardness of 40 to 60 which is lower than the Durometer D hardness of the outermost layer of the mantle; and the golf ball has a deflection when subjected to a load of 980 N (100 kg) of 2.0 to 4.0 mm, wherein at least one layer of the mantle is made of a mixture comprising: 100 parts by weight of resin components which include a base resin of (M) an olefin/unsaturated carboxylic acid binary random copolymer or a metal ion neutralization product of an olefin/unsaturated carboxylic acid binary random copolymer or both, and (N) an olefin/unsaturated carboxylic acid/unsaturated carboxylic acid ester ternary random copolymer or a metal ion neutralization product of an olefin/unsaturated carboxylic acid/unsaturated carboxylic acid ester ternary random copolymer or both in a weight ratio M/N of 100:0 to 25:75, in combination with (P) a non-ionomeric thermoplastic elastomer in a weight ratio (M+N)/P of 100:0 to 50:50;

(Q) 5 to 80 parts by weight of a fatty acid or fatty acid derivative having a molecular weight of 280 to 1,500, or both; and (R) 0.1 to 10 parts by weight of a basic inorganic metal compound capable of neutralizing un-neutralized acid groups in the base resin and component Q.

13. A multi-piece solid golf ball comprising a solid core, a mantle of at least one layer and a cover, wherein the core is obtained by molding and vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 parts by weight of organic peroxide, has a diameter of 30 to 40 mm and has a deflection when subjected to a load of 980 N (100 kg) of 2.5 to 6.0 mm;

the mantle is made primarily of a thermoplastic resin, has a thickness of at least 0.5 mm, has a Durometer D hardness of 30 to 70, and includes an outermost layer which is in contact with the cover and has a specific Durometer D hardness;

the cover is made primarily of a thermoplastic polyurethane, has a thickness of 0.5 to 2.5 mm and has a Durometer D hardness of 40 to 60 which is lower than the Durometer D hardness of the outermost layer of the mantle; and the golf ball has a deflection when subjected to a load of 980 N (100 kg) of 2.0 to 4.0 mm, wherein at least one layer of the mantle is made of a mixture comprising:

resin components which include at least one base resin selected from the group consisting of (M) olefin/unsaturated carboxylic acid binary random copolymers and metal ion neutralization products thereof and (N) olefin/unsaturated carboxylic acid/unsaturated carboxylic acid ester ternary random copolymers and metal ion neutralization products thereof, in combination with (P) a non-ionomeric thermoplastic elastomer in a weight ratio (M+N)/P of 100:0 to 50:50;

(Q) a fatty acid or fatty acid derivative having a molecular weight of 280 to 1,500, or both;

(R) a metal ion source capable of neutralizing un-neutralized acid groups in the base resin and component Q; and (S) a compound which has a molecular weight of not more than 20,000 and bears at least two reactive functional groups.

14. A four-piece solid golf ball comprising a solid core, a two-layer mantle and a cover, wherein the core is obtained by molding a vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm;

the mantle is composed of an inner layer and an outer layer which is in contact with the cover, each of the two layers being made of a thermoplastic resin, having a thickness of 0.5 to 2 mm and having a Durometer D hardness of 30 to 70;

the cover is made primarily of a thermoplastic polyurethane, has a thickness of 0.5 to 2.5 mm and has a Durometer D hardness of 40 to 60 which is lower than the Durometer D hardness of the outer layer of the mantle; and the golf ball has a deflection when subjected to a load of 980 N (100 kg) of 2.0 to 4.0 mm, wherein the rubber composition from which the core includes:

(A) 100 parts by weight of a base rubber, (B) 10 to 60 parts by weight of an unsaturated carboxylic acid or an unsaturated carboxylic acid metal salt or both, (C) 0.1 to 5 parts by weight of an organic sulfur compound, (D) 5 to 80 parts by weight of an inorganic filler, and (E) at least two different organic peroxides.

15. A four-piece solid golf ball comprising a solid core, a two-layer mantle and a cover, wherein the core is obtained by molding a vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm;

the mantle is composed of an inner layer and an outer layer which is in contact with the cover, each of the two layers being made of a thermoplastic resin, having a thickness of 0.5 to 2 mm and having a Durometer D hardness of 30 to 70;

the cover is made of a composition consisting essentially of:

(G) a thermoplastic polyurethane material, and (H) an isocyanate mixture obtained by dispersing (h1) an isocyanate compound bearing as functional groups at least two isocyanate groups per molecule in (h2) a thermoplastic resin which substantially does not react with isocyanate, and has a thickness of 0.5 to 2.5 mm and has a Durometer D hardness of 40 to 60 which is lower than the Durometer D hardness of the outermost layer of the mantle; and the golf ball has a deflection when subjected to a load of 980 N (100 kg) of 2.0 to 4.0 mm.

16. A four-piece solid golf ball comprising a solid core, a two-layer mantle and a cover, wherein the core is obtained by molding a vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm;

the mantle is composed of an inner layer and an outer layer which is in contact with the cover, each of the two layers being made of a thermoplastic resin, having a thickness of 0.5 to 2 mm and having a Durometer D hardness of 30 to 70;

the cover is made primarily of a thermoplastic polyurethane, has a thickness of 0.5 to 2.5 mm and has a Durometer D hardness of 40 to 60 which is lower than the Durometer D hardness of the outer layer of the mantle; and the golf ball has a deflection when subjected to a load of 980 N (100 kg) of 2.0 to 4.0 mm, wherein at least one layer of the mantle is made of a mixture comprising: 100 parts by weight of resin components which include a base resin of (M) an olefin/unsaturated carboxylic acid binary random copolymer or a metal ion neutralization product of an olefin/unsaturated carboxylic acid binary random copolymer or both, and (N) an olefin/unsaturated carboxylic acid/unsaturated carboxylic acid ester ternary random copolymer or a metal ion neutralization product of an olefin/unsaturated carboxylic acid/unsaturated carboxylic acid ester ternary random copolymer or both in a weight ratio M/N of 100:0 to 25:75, in combination with (P) a non-ionomeric thermoplastic elastomer in a weight ratio (M+N)/P of 100:0 to 50:50;

(Q) 5 to 80 parts by weight of a fatty acid or fatty acid derivative having a molecular weight of 280 to 1,500, or both; and (R) 0.1 to 10 parts by weight of a basic inorganic metal compound capable of neutralizing un-neutralized acid groups in the base resin and component Q.

17. A four-piece solid golf ball comprising a solid core, a two-layer mantle and a cover, wherein the core is obtained by molding a vulcanizing a rubber composition comprising (A) 100 parts by weight of a base rubber which includes 60 to 100 wt % of a polybutadiene of at least 60 wt % cis-1,4 structure and synthesized using a rare-earth catalyst, (B) an unsaturated carboxylic acid or an unsaturated carboxylic acid metal salt or both, (C) an organic sulfur compound, (D) an inorganic filler and (E) 0.1 to 0.8 part by weight of organic peroxide, has a diameter of 30 to 40 mm and has a deflection when subjected to a load of 980 N (100 kg) of 2.5 to 6.0 mm;

the mantle is composed of an inner layer and an outer layer which is in contact with the cover, each of the two layers being made of a thermoplastic resin, having a thickness of 0.5 to 2 mm and having a Durometer D hardness of 30 to 70;

the cover is made primarily of a thermoplastic polyurethane, has a thickness of 0.5 to 2.5 mm and has a Durometer D hardness of 40 to 60 which is lower than the Durometer D hardness of the outer layer of the mantle; and the golf ball has a deflection when subjected to a load of 980 N (100 kg) of 2.0 to 4.0 mm, wherein at least one layer of the mantle is made of a mixture comprising:

resin components which include at least one base resin selected from the group consisting of (M) olefin/unsaturated carboxylic acid binary random copolymers and metal ion neutralization products thereof and (N) olefin/unsaturated carboxylic acid/unsaturated carboxylic acid ester ternary random copolymers and metal ion neutralization products thereof, in combination with (P) a non-ionomeric thermoplastic elastomer in a weight ratio (M+N)/P of 100:0 to 50:50;

(Q) a fatty acid or fatty acid derivative having a molecular weight of 280 to 1,500, or both;

(R) a metal ion source capable of neutralizing un-neutralized acid groups in the base resin and component Q; and (S) a compound having a molecular weight of not more than 20,000 which bears at least two reactive functional groups.

\* \* \* \* \*